Jan. 18, 1944.    D. D. MILNE ET AL    2,339,579
PSYCHOMETER
Filed Feb. 20, 1941    2 Sheets-Sheet 2

Inventor
Douglas D. Milne
John P. Fogarty
Jack B. Dunlevie
By Clarence A. O'Brien
Attorney Patented Jan. 18, 1944

2,339,579

UNITED STATES PATENT OFFICE 2,339,579

PSYCHOMETER

Douglas D. Milne, Larchmont, and John Philip Fogarty and Jack B. Dunlevie, Yonkers, N. Y.

Application February 20, 1941, Serial No. 379,910

11 Claims. (Cl. 128—2.1)

Our invention relates to means to detect small decreases in electrical resistance, and the primary object of the invention is to provide means for detecting such decreases in the electrical resistance between two points on the palm of the hand, regardless of the resistance level existing between these points, said detection being accomplished automatically and without the use of a manual control, thereby enabling any unskilled person to operate the device as a "lie detector" without requiring the presence or instruction of a trained psychologist or other technician.

Other important objects and advantages of our invention will be apparent from a reading of the following description of the appended drawings wherein a preferred embodiment of our invention is shown for illustrative purposes.

In the drawings—

Figures 4, 5:
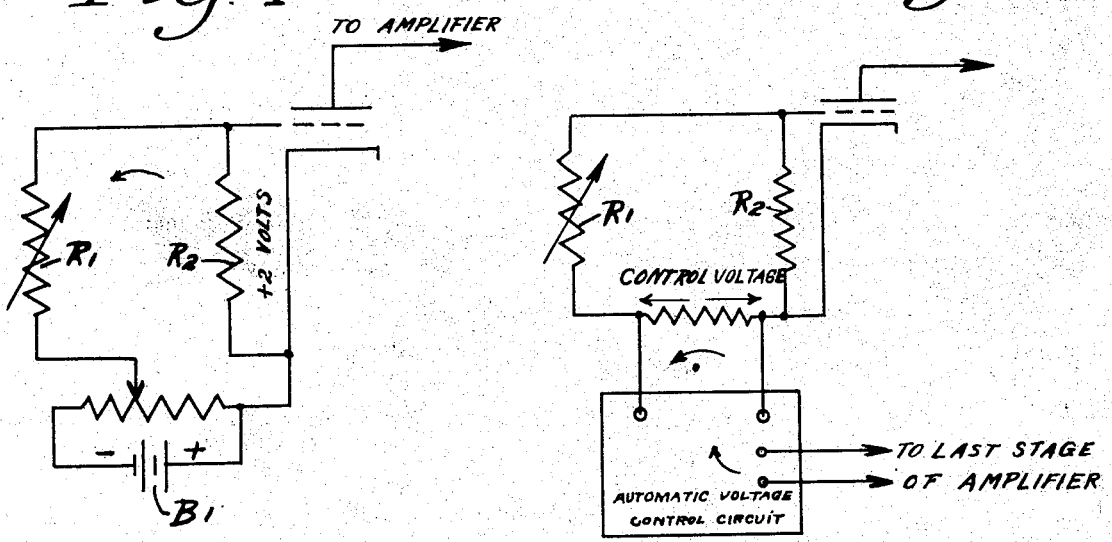
Figure 4 is a diagram of a manually controlled voltage divider, the purpose of which is to compensate for various values of $R_1$.

Figure 5 indicates that the manual control of Figure 4 has been eliminated by the introduction of the "automatic voltage control circuit" in this embodiment.

The primary utility presently contemplated for the invention is that of producing meter readings or recordings showing a subject's psychogalvanic responses to various stimuli, but the device is not necessarily limited to this use.

Figure 1:
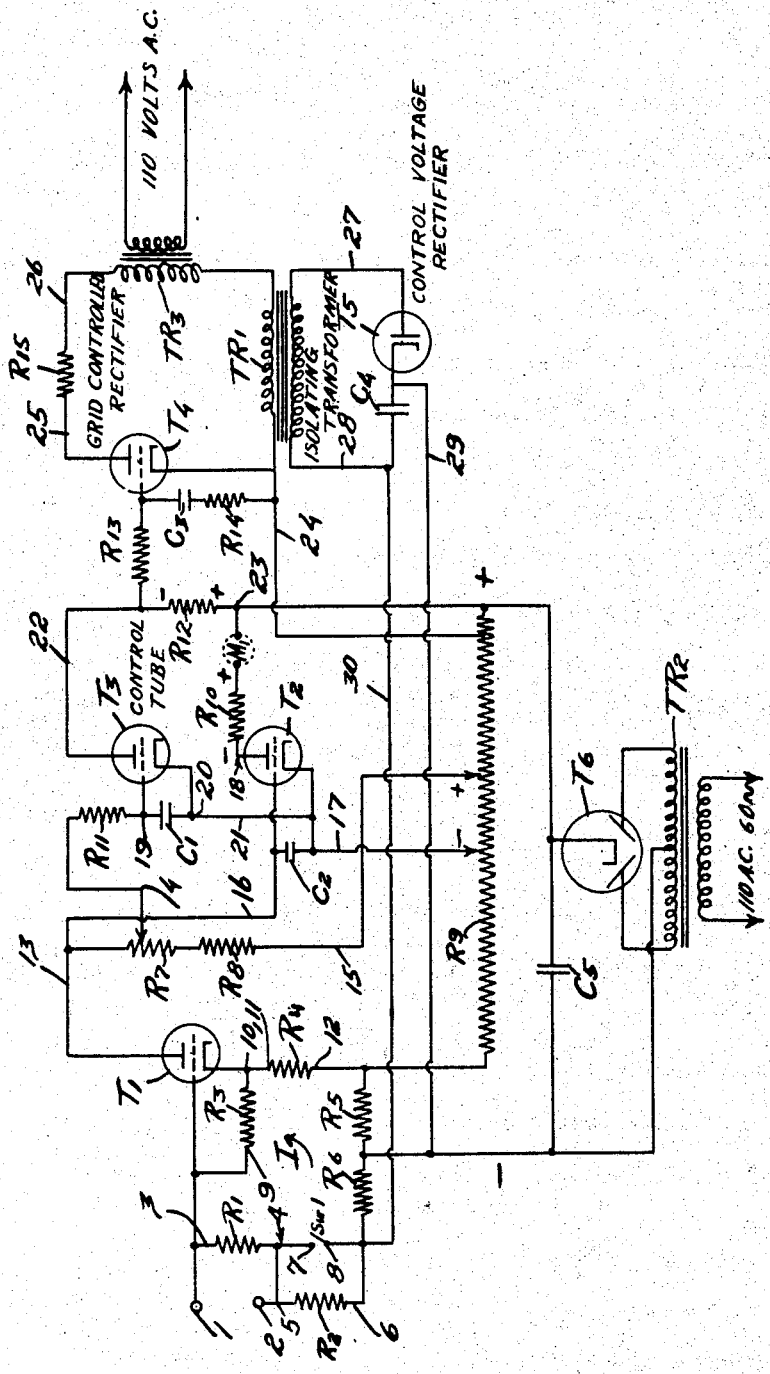
Figure 1 is a diagrammatic representation showing the components and their electrical connections comprising said embodiment.

The complete device is shown in Figure 1 of the drawings. The individual compositions and actions of the circuit elements are herein explained in advance of explanation of their cooperative functions described subsequently in this specification, in order that the functioning and operation of the invention may be clearly set forth.

Figure 2:
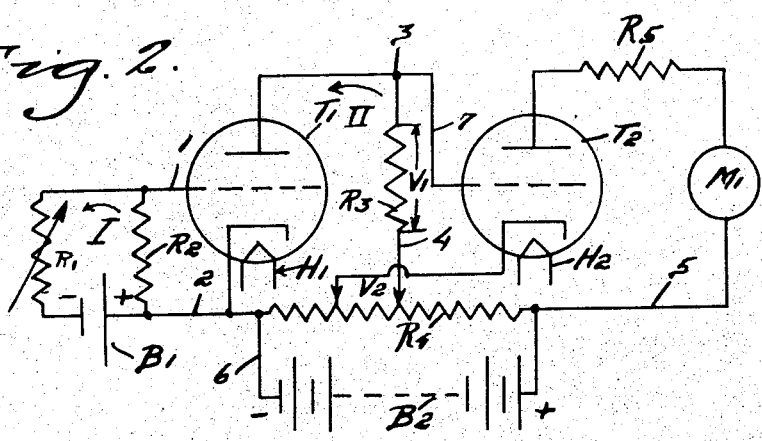
Figure 2 is a wiring diagram showing the fundamental two-stage direct coupled amplifier circuit employed.

The fundamental amplifier circuit is shown in Figure 2 and operates as follows:

$R_1$ is a variable resistance capable of offering any resistance value between zero and 500,000 ohms. This circuit element is substituted in Figure 2 as the electrical equivalent of the skin resistance between the electrodes when these electrodes are connected to the subject's palm. A small decrease in the resistance of $R_1$ is the electrical equivalent of the "psychogalvanic response" which is the psychological phenomenon to be detected.

$B_1$ is a small battery which impresses a voltage of approximately 5 volts on the circuit composed of $R_1$, $R_2$ and $B_1$. The current flow in this circuit will be equal to the battery voltage divided by the sum of the resistance $R_1$ and $R_2$, and the fact that each end of $R_2$ is connected to an element of the vacuum tube amplifier $T_1$ has no effect on this current flow since the grid of $T_1$ is at a negative potential with respect to the cathode. The voltage drop across $R_2$ will be equal to the battery voltage minus the drop across $R_1$. By connecting the negative end of $R_2$ to the grid or control element of the vacuum tube amplifier $T_1$ by means of wire 1, and by connecting the positive end of $R_2$ to the cathode element of $T_1$ by means of wire 2, the voltage drop which is present across $R_2$ due to the current flowing in circuit I is impressed as grid bias on $T_1$. When $R_1$ is reduced to a lower resistance value (which represents the psychogalvanic response) more current will flow in circuit I and there will be a greater voltage drop across $R_2$.

The plate of the tube $T_1$ is connected to a resistance $R_3$ by means of wire 3. Wire 4 connects the other end of $R_3$ to a point of the voltage divider $R_4$. The extremities of this voltage divider are connected to a high voltage "B" battery by wires 5 and 6, wire 5 being the positive terminal. If the battery voltage is 200 volts, wire 4 is connected to a point at which the potential difference between 6 and 4 is approximately 100 volts or half the supply voltage. Since wire 6 is connected to wire 2 and to the cathode of $T_1$, and since wire 4 is connected through the resistance $R_3$ to the plate of $T_1$, it follows that there will be a positive potential impressed between the plate and cathode of $T_1$. When the cathode of $T_1$ becomes heated and emits electrons, these electrons will flow through the control grid to the positively charged plate, thus causing a flow of current in the circuit composed of $T_1$, $R_3$ and the section of $R_4$ which supplies the impressed plate voltage. If this supply voltage remains constant, the current through $R_3$ will depend on the grid bias impressed on $T_1$ which is obtained from the voltage drop across $R_2$. The current through $R_3$ will change in the manner indicated in Figure 3.

Figure 3:
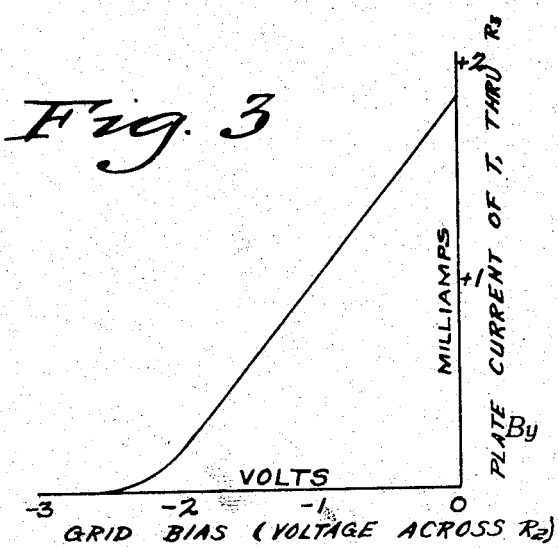
Figure 3 is a diagram illustrating the variation of the current flow through the load resistance $R_3$, or a tube characteristic curve.

From the tube characteristic curve of Figure 3, it may be seen that there will be no current through $R_3$ or $T_1$ when the grid bias (or the voltage drop across $R_2$) is more negative than —2.5 volts. When the grid bias on $T_1$ is —1 volt, however, a certain current will flow through $R_3$. This current II is indicated in the conventional manner as flowing from plus to minus in a counter clockwise direction and producing a voltage drop across $R_3$ designated as $V_1$. The 4 end of $R_3$ will be positive with respect to the 3 end when current flows.

Considering the circuit thus far, if $R_1$ is decreased suddenly by a given ohmic value (which represents the psychogalvanic skin response to be amplified), more current will flow in circuit I, this circuit being composed of $R_1$, $R_2$ and $B_1$. Since more current flows through $R_2$ the voltage drop across it will become greater when the change in $R_1$ takes place. This in turn means that the grid bias on $T_1$ will increase from —1 to —1.2 volts for example. Referring to Figure 3, it may be seen that this change in grid bias will change the plate current or the current through $R_3$ by some value. This decrease of current through $R_3$ will cause a decrease in the voltage drop designated as $V_1$.

Since the variation in $V_1$ is small when a response occurs, additional amplification is required. Essentially the same process is repeated again. As an illustration, assume that the voltage drop across $R_3$ ($V_1$) changes from 20 to 18 volts when a decrease in the subject's skin resistance takes place. The characteristic curve for the second amplifier tube $T_2$ is the same as that for $T_1$, so if this 20 volts were applied as grid bias for $T_2$, no plate current could flow. In order to make the second tube operate at all, it is necessary to reduce its grid bias to about —2 volts, and this is accomplished by connecting the cathode of $T_2$ to a point on the voltage divider $R_4$ which is approximately 17 volts more negative than the point where 4 wire connects. This voltage is designated as $V_2$. Since $V_1$ and $V_2$ are in opposite directions, the net grid bias applied to $T_2$ will be their difference. In terms of the illustration, this bias will be —20 +17 or —3 volts before the response, and —18 +17 or —1 volt after the change. Considering Figure 3 again, it will be seen that a change of grid bias between —3 and —1 volt produces a variation between zero and approximately 1.5 milliamperes in the plate current of $T_2$. If a 1 milliampere meter, as diagrammatically illustrated at $M_1$, in Figure 2, is placed in the plate circuit of $T_2$, full scale deflections may be obtained when $R_1$ is decreased slightly. The purpose of $R_5$ is to limit this plate current to 1 milliampere.

When the ohmic value of $R_1$ is slightly reduced in the two-stage direct coupled amplifier the following take place:

1. $R_1$ offers less resistance to its circuit.
2. The current increases through $R_1$, $R_2$ and $B_1$.
3. The voltage drop across $R_2$ increases slightly.
4. Tube $T_1$ receives more negative bias.
5. The plate current through $R_3$ decreases by an amount dependent upon the amplification constant of the tube.
6. The voltage drop across $R_3$ decreases.
7. The grid bias on $T_2$ becomes less negative.
8. Much more current flows through $T_2$ and a meter reading is obtained.

With this understanding of the operation of the direct coupled amplifier, the explanation of the complete circuit is made much simpler. As has been stated, the complete circuit was designed to amplify small decreases in $R_1$ regardless of its resistance value. This could be done by a manually adjustable resistance or potentiometer $R_2$ such as is indicated in Figure 2, wherein a potentiometer or voltage divider is connected across the battery $B_1$ so that the voltage impressed across $R_1$ and $R_2$ may be varied. Assuming that it is desired to have the milliameter of Figure 2 resting at a point slightly above zero so that full scale deflections may be measured, and that in order to obtain this condition the grid bias on $T_1$ must be —2 volts, the voltage drop across $R_2$ must always be two volts. If $R_1$ (which represents the subject's skin resistance) is very high in its ohmic value, only a very small current will flow through $R_2$ and there will not be the required two volt drop across it. On the other hand, if the subject's skin resistance is very low, there may be a three volt drop across $R_2$. To compensate for this variation in individuals, the voltage divider could be adjusted to the required point so that there is a two volt drop across $R_2$. The meter in the second stage would then rest at a point just above zero, and when the decrease in $R_1$ took place the meter would show an increase in current as previously explained.

This type of control, or some other manual control is used in common circuits to maintain the meter at an above-zero rest point. In some "lie detectors" three or four controls are necessary to accomplish what the present device does automatically. Every individual has a different level of skin resistance, and with the present type of metal electrodes this level of resistance is continually changing. To compensate for these changes an operator is required to make frequent adjustments in order to maintain the meter at its predetermined rest point. These adjustments are necessarily subjective in nature and are therefore a source of error and waste of time.

In the present device the voltage divider of Figure 4 is replaced by a fixed resistance and an automatic voltage control circuit as shown in Figure 5. The function of the automatic voltage control circuit is to maintain a sufficient voltage drop across the fixed resistance so that just enough current will flow through $R_2$ to produce a two volt drop across it regardless of the resistance of $R_1$. If the subject's resistance is high, the control voltage will build up to 12 or 15 volts, or until the meter in the second amplifier tube is "floating" above zero. On the other hand, if the subject's resistance is low, the control voltage will fall to some low value so that the meter is still just floating. During an experiment the subject's resistance may "drift" through several hundred thousand ohms. This drifting is a slow change not to be confused with the psychogalvanic response, and as it takes place, the control voltage will drift correspondingly so that the meter rests at the same predetermined rest point. Meter deflections are obtained only when an actual response occurs, and the meter is returned to its floating position immediately after the response reaches its maximum magnitude.

In order to accomplish this function, the control voltage must fulfill the following requirements:

1. It must have sufficient magnitude to cause the meter to rest just above zero regardless of the value of the subject's resistance.
2. It must be completely isolated and entirely independent of the supply voltage; otherwise a short circuit would result.

3. It must remain essentially constant throughout the duration of the psychogalvanic response which is to be detected; otherwise the meter deflections due to actual responses would be canceled by the action of the control circuit.

The problem having been stated and the required operation outlined above, the circuit as a whole will now be discussed. It is to be understood that several variations on this circuit are possible of which the essential characteristics are as follows:

(1) An input circuit of which the electrodes are a part.

(2) An amplifier circuit capable of amplifying irregularities or variations in the magnitude of direct current flowing through a resistance, said variations being caused by the psychogalvanic response. A complex current of this nature apparently has a component of zero frequency, upon which is superimposed a pulsating current component, the alternations or variations of which occur at irregular rate. The pulsations are a small percentage of the total current and occur irregularly with varying amplitude.

(3) A time delayed control tube circuit.

(4) A means of converting the output of this delayed circuit from direct to alternating current.

(5) A means of isolating the output of the delayed control circuit from the supply voltage for the amplifier tubes.

(6) A means of rectifying this isolated voltage and applying it to the input circuit of the amplifier.

(7) A means of adjusting the rest point of the meter.

(8) A means of controlling the sensitivity of the amplifier.

In Figure 1 of the drawings showing the complete circuit of the present device, 1 and 2 are the metal electrodes which are placed in contact with the subject's palm and held firmly. Electrode 1 is connected to point 3 which is one end of a 500,000 ohm resistor. Electrode 2 is connected to point 4, the other end of this resistor. The purpose of this resistor is to limit the voltage developed by the automatic voltage control circuit as will be explained later. It is also a shunt resistance across the electrodes to limit the range to be covered to values under 500,000 ohms.

Points 5 and 7 are also connected to electrode 2. Point 5 is one end of the resistance $R_2$ and point 6 is the other end of this resistance. $R_2$ has an ohmic value of 50,000 ohms, and its function is to decrease the sensitivity of the amplifier by acting as a resistance in series with the electrodes. When a change takes place in the subject's resistance, about 50 per cent of the voltage variation produced will take place across this resistance and limit the change taking place across $R_3$. This in turn limits the meter reading obtained to about 50 per cent of that which would be obtained if $R_2$ had been shorted by the switch $Sw_1$.

Points 6 and 8 are connected together, point 8 being one terminal of a single pole throw switch, and point 7 being the other. This switch, designated as $Sw_1$, is provided as a means of sensitivity control. If this switch is open, $R_2$ performs the function described above, but if $Sw_1$ is closed, $R_2$ is short circuited and no longer decreases the sensitivity of the apparatus. It was found that persons with strong reactions gave "off-scale" deflections of the meter regardless of the stimulus, so this means of decreasing the sensitivity was provided so that a more quantitative measure could be obtained.

Points 9 and 10 are the terminals of the resistor $R_3$, this resistor having a value of 50,000 ohms. Point 9 is connected to point 3, and 10 is connected to the cathode of the first amplifier tube $T_1$. Point 9 is also connected to the grid element of $T_1$. The function of $R_3$ is to provide a voltage drop in the electrode circuit which may be applied to $T_1$ as grid bias. The voltage drops developed in the resistors $R_4$, $R_5$ and $R_6$ are applied to the circuit consisting of $R_1$, $R_2$ and $R_3$ causing a flow of current indicated by I. This current produces a voltage drop across $R_3$, point 9 being negative with respect to point 10. When a decrease of the subject's resistance takes place, the current through $R_3$ increases and the grid bias on $T_1$ is therefore increased (in a negative direction) and the plate current in $T_1$ is decreased.

Points 11 and 12 are the terminals of a 2,500 ohm resistance $R_4$. Point 10 is connected to the cathode of $T_1$ and to the point 11. Since the plate current of $T_1$ must flow through $R_4$ also, a small voltage drop will be produced across it. This drop is used as a certain percentage of the voltage applied to the electrode circuit, and is in the same direction as the voltage drop across $R_5$ and $R_6$.

Wire 13 connects the plate of $T_1$ to one end of the potentiometer $R_7$, while the other end of said potentiometer is connected to $R_8$. The values of these resistors are 250,000 ohms each, $R_7$ having a variable tap which controls the rest point of the meter. $R_7$ and $R_8$ provide the load resistance for $T_1$ and the grid bias voltage for the following amplifier tube $T_2$ and the control tube $T_3$. The reason why the variable tap 14 on $R_7$ controls the rest point of the meter is explained further on herein.

Wire 15 connects $R_8$ to a point which is approximately at the center of the voltage divider $R_9$. It is from this point that $T_1$ obtains its plate voltage.

Wire 16 connects the plate of $T_1$ to the grid of $T_2$, and wire 17 connects the cathode of $T_2$ to the junction of the wire 17 and the voltage divider $R_9$, which point is approximately 60 volts more negative than the point where wire 15 is connected. This voltage drop is in a direction opposite to that across $R_7$ and $R_8$, with the result that the net grid voltage on $T_2$ is within the operating limits of the tube. If wire 17 were connected directly to wire 15, the grid bias on $T_2$ would be far beyond the plate current cut-off point, but by connecting 17 to a point more negative than 15, the grid bias on $T_2$ may be brought nearer zero so that plate current flows and a meter reading may be obtained.

Wire 18 connects the plate of tube $T_2$ to its load resistance $R_{10}$. The value of this resistance is about 150,000 ohms, and its function is to limit the plate current of $T_2$ to one milliampere which is the current required to give a full scale deflection of the meter $M_1$ of Figure 1, to one side of which $R_{10}$ is connected. The other side of the meter M is connected to the positive side of the voltage divider $R_9$ which supplies plate voltage for the amplifier tubes.

The operation of the circuit thus far is as follows:

a. When a psychogalvanic response takes place between the electrodes 1 and 2, the electrical resistance between these points is suddenly decreased by a small ohmic value.

b. This decrease of resistance causes more current to flow through the resistance $R_3$, and increases the voltage drop across it by a small amount.

c. Since $R_3$ is connected to the input terminals of the amplifier tube $T_1$, the grid bias between these elements will be increased, and the flow of electrons from cathode to plate will be decreased due to the repelling and controlling action of the grid wires.

d. Since the plate current for $T_1$ flows through $R_7$ and $R_8$, there will be a sudden decrease in the voltage drop present across these combined resistors.

e. Since the second amplifier tube obtains its grid bias from the difference between the drop across the resistors $R_7+R_8$ and the aforementioned portion of the voltage divider $R_9$, the plate current through $T_2$ will increase from nearly zero to some value less than one milliampere and dependent upon the gain of the amplifier and the magnitude of the initial variation of the subject's resistance.

This completes the disclosure of the amplifier circuit itself, and the additions which have been made to deliver the required variable voltage drop across the resistance $R_6$, which additions constitute the automatic control feature, will now be explained.

Since the operation of the automatic voltage control circuit is to bring the meter back to a rest point just above zero, its action must be dependent upon the current flowing through the meter. If a resistor were placed in series with the meter, the voltage drop across this resistor would be proportional to the current flowing through the meter. If this voltage were then isolated from the supply voltage for the amplifier tubes and applied to the electrodes in the opposite direction with respect to the already existing grid bias for the first tube, the action would be as follows: When there was no current flowing through the meter, there would be no control voltage "bucking" the grid bias on the first tube of the amplifier. As a result, the voltage across the electrodes would be at its maximum value. When a person placed his hand across the electrodes, the meter would immediately go off scale. With current flowing through the meter, there would be a voltage drop in the meter resistance which, when brought back to the input circuit, would tend to decrease the electrode voltage or the bias on the first tube. Regardless of what resistance was placed across the electrodes, the meter would always be brought to zero by this action. If this control action were made very slow in its operation, meter deflections would be obtained when responses occurred, and the rapid rise and fall of current through the meter would not effect the "control voltage" at all. This is the fundamental idea behind our invention, but the desired operation was accomplished in a somewhat different manner.

Instead of using the current through the meter as the controlling factor, another tube "in parallel" with the second amplifier has been added. This "control tube" operates essentially the same as the second amplifier tube with the exception that its action is delayed. When a resistance is placed across the electrodes, the current in the second amplifier tube rises immediately to 1-milliampere or its maximum value. Due to the fact that a time delay resistance and condenser combination $R_{11}$ and $C_1$ of Figure 1 is connected to the grid of the control tube $T_3$, the current in the plate circuit of this tube will not reach its maximum value for two or three minutes. A resistance $R_{12}$ in the plate circuit of the tube $T_3$ will deliver the slowly changing control voltage required to give the desired operation mentioned above.

It would be a simple matter to apply this voltage to the electrode circuit directly except for the fact that a short circuit of the power supply for the amplifier tubes would result. Some means of isolating this voltage had to be devised. The simplest method of coupling two circuits without any electrical connection is by means of a transformer, but this method requires alternating current. The voltage appearing across the plate resistance of the control tube must therefore be changed into alternating current by some means. This voltage was therefore made to control the flow of pulsating direct current in a "grid controlled rectifier" circuit by using the voltage as grid bias.

This "grid controlled rectifier" circuit consists of no more than a tube $T_4$ of Figure 1 in series with two transformers, wherein the transformer $TR_3$ impresses an A. C. voltage on this circuit, but due to the fact that no current can flow through the tube during the half cycle when the plate is negative with respect to the cathode, only the current pulses of the other half cycle flow through the circuit. The magnitude of these pulses is controlled by the voltage drop across the resistance in the plate circuit of the control tube, this magnitude being inversely proportional to the grid bias as illustrated in Figure 3. The greater the flow of current through the control tube, the less will be the amplitude of the D. C. pulses through the grid controlled rectifier. The other transformer in this circuit is the "isolating transformer." The D. C. pulses in the primary winding are transformed into alternating current in the secondary winding.

The A. C. output of the isolating transformer is then converted back into direct current by the action of the "control voltage rectifier tube $T_5$ of Figure 1." This output is in turn filtered and applied to the terminals of a resistance in the electrode circuit. The voltage drop across the resistance $R_6$ is the "control voltage" and is directly dependent on the current flowing in the grid controlled rectifier circuit and inversely dependent on the current flowing in the plate circuit of the control tube. For this reason, instead of connecting the control voltage so it bucks the fixed bias on the first tube, it is connected so it adds to this bias thus returning the meter to zero.

Before giving a specific description of the circuit, its operation is reviewed as follows: When there is no subject connected to the electrodes, the first amplifier tube will be practically at zero bias and the current in its plate circuit will be at a maximum. The voltage drop across the resistance in this plate circuit will be high, so the second amplifier tube will be at plate current cut-off and no curent will flow through the meter. The control tube, which has practically the same bias as the second amplifier, will be very nearly at cut-off, and the drop across the plate resistance in its circuit will be very small. As a result, the pulsating current flowing in the grid controlled rectifier circuit will be a maximum, since this tube has zero bias. The A. C. output of the isolating transformer will also be at its maximum value, and hence the control voltage will be high. When a person places his hand across the electrodes, the control voltage is sufficiently high, regardless of the subject's resistance, to bias the first tube almost to cut-off. The second amplifier tube then has a low value of grid bias, and it draws maximum current. About a minute later the control tube begins to draw current through its load resistance. This starts to give the grid controlled rectifier more bias, thus reducing the flow of pulsating D. C. current and the electrode control voltage. As soon as the control voltage has fallen to the point where the meter is almost at zero, the control tube plate current stops increasing and the control voltage is maintained at whatever value is required to make the meter float just above zero. The subject's responses are a rapid decrease and slightly slower increase of resistance giving rise to a cliff type curve, the recovery portion not always returning to the same level as that from which it started. These pulses are so rapid that the bias on the grid controlled rectifier remains essentially constant due to the action of the time delay circuits. If there is no recovery, however, this bias changes, and the meter is automatically returned to its rest point.

To continue with the specific disclosure, wire 14 connects the load resistance $R_7$ of the first amplifier to the time delay resistance $R_{11}$. The point at which wire 14 connects to $R_7$ is made adjustable so that the rest point of the meter may be controlled. Moving this tap changes the bias on the control tube $T_3$ and hence changes the point at which the control voltage will "settle down."

Point 19 is the grid end of the time delay resistance. This resistance has a value of approximately 30 megohms, and its function is to provide a high resistance path to the flow of the charging current for the time delay condenser $C_1$. The higher the resistance of this element, the slower will be the rate of charge and discharge of the condenser $C_1$.

Point 19 is connected to the grid of the time delay control tube $T_3$.

Point 20 is the cathode side of the condenser $C_1$, this condenser being connected directly from grid to cathode of the tube $T_3$. $C_1$ is a high grade paper condenser having a capacity of 1-microfarad.

The cathode of $T_3$ is connected to the cathode of $T_2$ by means of wire 21. This connection is made so that $T_3$ will have the same plate supply voltage as $T_2$.

Between wires 16 and 17 (or from grid to cathode of $T_2$) is connected another 1-microfarad paper condenser, $C_2$ of Fig. 1, the function of which is to dampen down small fluctuations in the circuit and to make the action of the meter slightly smoother.

Wire 22 connects the plate of $T_3$ to its load resistance $R_{12}$. This resistor has a value of 20,000 ohms, and the drop across it is used to control the electrode voltage or "control voltage." When $C_1$ discharges, the current through $R_{12}$ increases. Wire 23 connects the other end of $R_{12}$ to the positive terminal of the voltage supply.

Wire 22 is connected to resistance $R_{13}$ and the other end of this resistance goes to the grid element of the "grid controlled rectifier" $T_4$. The resistance $R_{13}$ is an additional time delay resistance of 10 megohms and decreases the charging rate of the condenser $C_3$.

$R_{14}$ is 5 megohms in series with $C_3$. This combination of $C_3$ and $R_{14}$ is connected from grid to cathode of the tube $T_4$. As the voltage across $R_{12}$ is building up, $C_3$ begins to charge and $T_4$ receives more bias. $C_3$ is a paper condenser of 1-microfarad.

Wire 24 connects the cathode of $T_4$ to a point on the voltage divider which is about 20 volts less positive than the positive end of $R_{12}$. This connection is made to prevent $T_4$ from going to cut-off (zero plate current) when there is a drop across $R_{12}$. When there is no drop across $R_{12}$ the grid of $T_4$ has positive polarity, but no appreciable grid current can be drawn since $R_{13}$ has such a high ohmic value.

Wire 25 connects the plate of the grid controlled rectifier $T_4$ to a current limiting resistance $R_{15}$ which has a value of 500 ohms. Wire 26 connects the other end of this resistance to the power transformer $TR_3$. This transformer delivers 250 volts across the secondary winding when the primary side is connected to 110 volts A. C. It supplies A. C. plate voltage for the tube $T_4$ which only allows the half cycle during which the plate is positive with respect to the cathode to pass through the circuit. The transformer $TR_1$ (primary side) is connected from cathode $T_4$ to the other ide of the power transformer $TR_3$. Pulsating direct current flows through this circuit composed of $T_4$, $TR_1$ and $TR_3$, the amplitude of which current depends upon the grid bias of $T_4$.

$TR_1$ is an "audio" transformer having a step-up ratio of 1 to 4. The pulses of direct current flowing through its primary cause alternating current to be induced in the secondary winding. Wire 27 connects one side of the secondary winding to the plate of a rectifier tube $T_5$, and at the other side 28, there will be present the variable negative voltage applied to the electrode circuit. This variable voltage controls the current flowing in the electrode circuit and, therefore, the current flowing in meter $M_1$ of Figure 1. $C_4$ is connected between 28 and the cathode or positive terminal of $T_5$. $C_4$ is a low voltage 8-microfarad filter condenser which tends to remove the pulsations or A. C. components which would otherwise be present in the output of the rectifier $T_5$.

Wire 29 connects the cathode of $T_5$ to the negative terminal of the voltage divider which is in turn connected to a point at the junction of $R_5$ and $R_6$. Wire 30 connects the negative terminal of the output of the control voltage rectifier $T_5$ to the end of $R_4$ which is not connected to $R_5$. The D. C. voltage drop across $R_6$ is termed the "control voltage" since it is this voltage which controls the operation of the entire circuit.

The power supply for the amplifier tubes is standard and delivers 500 volts of filtered D. C. into the bleeder resistance or voltage divided $R_9$, equal to 25,000 ohms. $C_5$ is the filter condenser of 8-microfarads.

The resistance $R_6$ is equal to 100 ohms and is connected in series with the bleeder resistance $R_9$. The small voltage drop obtained across this resistor is used as a certain percentage of the fixed bias on the first tube $T_1$, the rest being obtained from the drop across $R_4$.

$R_5$ has a value of between 3,000 and 5,000 ohms depending on the output of the automatic voltage control circuit.

In a circuit of this nature the absolute magnitudes of the various currents and voltages present is not important. The manner in which these quantities change during operation is important, however, and a more lucid explanation of the operation may be given if relative rather than absolute terms are used. Many variations in the circuit constants, the sizes of condensers and resistors, are possible, but due to the degenerative nature of the circuit, the ultimate results will be essentially the same. The interdependence and interrelations between the elements of the concatenation are exhibited by the following resume of operation.

To put the device in operation, the designated points of Figure 1 are connected to a 110 volt alternating current source. Before the subject to be tested is connected to the electrodes, the following relative conditions exist in the circuit:

(1) The current through the electrode circuit consisting of the resistors $R_1$ to $R_6$, inclusive, is small, being limited by $R_1$ which is a high resistance across the electrodes. What current does flow is caused largely by the voltage drop present across $R_6$, which, as will be seen presently, is relatively high.

(2) Since the current flow through $R_3$ is small, there will only be a small voltage drop across it, hence only a small negative voltage on the control grid of $T_1$.

(3) With only a small value of grid bias on $T_1$, the current in the plate circuit of this tube will be high, thus causing a high voltage drop across the resistors $R_7$ and $R_8$.

(4) Since the voltage drop across $R_7$ and $R_8$ is applied to $T_3$ and $T_4$ as grid bias, these two tubes will be biased almost to the point of plate current cut-off. The indicating meter $M_1$ will be almost at zero, and there will only be a slight voltage drop across $R_{12}$.

(5) Since the voltage drop across $R_{12}$ is small, there will be very little negative bias on $T_4$, hence the magnitude of direct current pulses flowing through this tube and the transformers in series with it will be high.

(6) Since the current flowing through the primary winding of the isolating transformer $TR_1$ is high, the alternating current voltage appearing across the secondary is high, with the result that the rectified voltage across $C_9$ and $R_6$ is high, as was stated in (1) above. To be more quantitative, the voltage across $R_6$ is just high enough to force enough current through $R_1$ to deliver enough bias to $T_1$ to make the indicating meter rest at a point just above zero.

(7) When a subject is connected to the electrodes, the effect is the same as though $R_1$ were decreased about 50 per cent. This means that much more negative bias would appear on $T_1$ due to the increase of current through $R_3$.

(8) Since the plate current of $T_1$ is greatly reduced by this increase of bias, the drop across $R_7$ and $R_8$ will be reduced, thus reducing the bias on $T_2$.

(9) The indicating meter in the plate circuit of $T_2$ will therefore read full scale, and the time delay condenser $C_1$ will begin to discharge through the high resistance $R_{11}$, thus decreasing the bias on $T_3$ and increasing its plate current slowly.

(10) As the plate current of $T_3$ increases, the drop across $R_{12}$ increases, and the second time delay condenser $C_3$ begins to charge up through the high resistance $R_{13}$.

(11) As $C_3$ charges up, the negative bias on $T_4$ increases, decreasing the pulsating current flowing through $T_4$, $TR_3$ and $TR_1$.

(12) The secondary voltage of the isolating transformer is therefore decreased, hence the voltage drop across $R_6$ is decreased.

(13) Within approximately one minute, this process reaches an equilibrium condition, and all currents stop changing. This point of balance is determined by setting the variable tap on $R_7$, the latter being adjusted so that the indicating meter rests just above zero regardless of the resistance connected between the electrodes, i. e., the subject. In order for the circuit to operate in the manner described, there must of necessity be some variation of current through the meter when high and low resistance subjects are connected to the electrodes, but this variation is small and does not require compensation.

(14) Now, if a small sudden decrease in resistance takes place at the electrodes, the general effect will be the same as that described for the large reduction of resistance that took place when the subject was originally connected. However, due to the relative rapidity with which the resistance across the electrodes is decreased and subsequently increased to approximately its former value when a response takes place, the voltage across $R_6$ does not have sufficient time to change appreciably. The bias on $T_2$ is instantly decreased slightly when a response takes place, therefore the meter indicates an increase of current, but the two time delay circuits connected to the control grids of $T_3$ and $T_4$ operate to maintain the voltage applied to the electrode circuit at a constant value during a response.

(15) If the subject experiences a severe emotional shock, his electrical resistance may decrease and not come back again to its former level. It is this fact which makes it necessary to make some manual compensating adjustment to psychogalvanometers previously developed, but from this disclosure, it will be observed that the indicating meter is automatically restored to its original rest point through the delayed action of the automatic voltage control circuit.

Although we have shown and described herein a preferred embodiment of our invention, it is to be definitely understood that we do not wish to limit the application of the invention thereto, except as may be required by the scope of the subjoined claims.

Having described the invention, what is claimed as new is:

1. A device for automatically detecting decreases in the electrical resistance between two points on a body regardless of the resistance level existing between these two points before the change took place, said device comprising a pair of electrodes to contact the said points, an input circuit including said electrodes, an amplifier circuit capable of amplifying direct current changes fed by said input circuit, a time delay control tube circuit, first means for converting the output of the time delay control circuit from direct to alternating current, second means for isolating the output of the time delay control circuit from the supply voltage for said amplifier circuit, third means for rectifying the resultant isolated voltage and applying the rectified resultant to the input of said amplifier circuit, fourth means for adjusting the sensitivity of said amplifier circuit, a meter operated by said amplifier circuit, and fifth means for adjusting the rest point of said meter.

2. A device for automatically detecting decreases in the electrical resistance between two points on a body regardless of the resistance level existing between these two points before the change took place, said device comprising a pair of electrodes to contact the said points, an input circuit including said electrodes, an amplifier circuit capable of amplifying direct current changes, said amplifier circuit being fed by said input circuit and having an indicator in the last stage thereof, an automatic voltage adjusting circuit comprising a time delay control tube circuit, first means for converting the output of said time delay control tube circuit from direct to alternating current, second means for isolating the output of the time delay control circuit from the supply voltage for said amplifier circuit, third means for rectifying the resultant isolated voltage and applying the rectified resultant to the input of said amplifier circuit, said automatic voltage adjusting circuit being thereby arranged to act as a time-delayed, inverse, direct current feedback circuit operating to maintain the indicator in the amplifier circuit at a predetermined rest point regardless of slow changes in the resistance between the said two points while permitting the more rapid changes in the resistance between the two points to pass through said amplifier circuit and operate said indicator.

3. A device for detecting small rapid changes in electrical resistance between two points on a body, regardless of the existing resistance level before the change took place, said device being automatic in its operation and designed primarily for use in detecting the psychogalvanic response without the necessity of making manual adjustments during the test period, said device comprising (a) a direct coupled amplifier circuit, (b) a time delayed control tube circuit operating in parallel with the last stage of the direct coupled amplifier circuit, (c) a grid controlled rectifier circuit in which direct current pulsations are controlled by the action of the above mentioned time delayed circuit, (d) a transformer which converts the pulsating direct current flowing in the grid-controlled rectifier circuit into alternating current, this alternating current being electrically isolated from the voltage supply for the amplifier tubes, and (e) a rectifier circuit which rectifies the alternating voltage appearing at the secondary of the isolating transformer, the alternating current component of this voltage being subsequently filtered out and the remaining direct current voltage applied to the input circuit of the amplifier.

4. A device in accordance with claim 3 wherein means are provided for detecting the psychogalvanic response through visual observation of an indicating meter.

5. A device in accordance with claim 3 wherein means are provided for adjusting the rest point of said indicating meter.

6. A device for detecting small rapid decreases in the electrical resistance between two points on a body regardless of the resistance level existing between these points before the change took place, said device being designed primarily for use as a psychogalvanometer, and operating in such a manner as to automatically compensate for slow variations in the ohmic value of resistance connected to the input terminals of electrodes, thus eliminating the necessity for making manual adjustments to mantain the indicating meter at some predetermined rest point, said device comprising (1) an input circuit consisting of a pair of electrodes to contact said points, and a fixed resistance delivering the output of an automatic voltage adjusting circuit, (2) an element consisting of a direct coupled amplifier circuit; (3) an element consisting of a time-delayed control tube stage operating in parallel with the last stage of the direct coupled amplifier, (4) an element consisting of a grid-controlled rectifier circuit in which the amplitude of current pulses is controlled by the direct current output of the above mentioned time-delayed circuit, (5) an element consisting of an isolating transformer in series with the grid-controlled rectifier circuit, (6) an element consisting of a rectifier and filter circuit which converts the alternating current output of the isolating transformer into direct current applied to the input circuit element (1).

7. A device in accordance with claim 6, wherein elements (3) through (6) comprise an automatic voltage adjusting circuit or a time-delayed, inverse, direct-current feedback circuit operating in such a manner as to maintain the indicating meter in the last amplifier stage at a predetermined rest point regardless of slow changes in the subject's effective resistance, but at the same time permitting the more rapid changes caused by the psychogalvanic response to pass through the amplifier and be indicated by the meter.

8. A device in accordane with claim 6 wherein means are provided for detecting small sudden departures from any resistance level through visual observation of an indicating meter or recorder.

9. A device in accordance with claim 6 wherein means are provided for adjusting the rest-point of the indicating meter.

10. A device in accordance with claim 6 wherein means are provided for adjusting the sensitivity of the instrument.

11. A device in accordance with claim 3 wherein means are provided for controlling the sensitivity of the apparatus.

DOUGLAS D. MILNE.
JOHN PHILIP FOGARTY.
JACK B. DUNLEVIE.